Feb. 11, 1964 J. T. HASTINGS ETAL 3,120,964
GOLF CART BRAKE
Filed Nov. 15, 1960
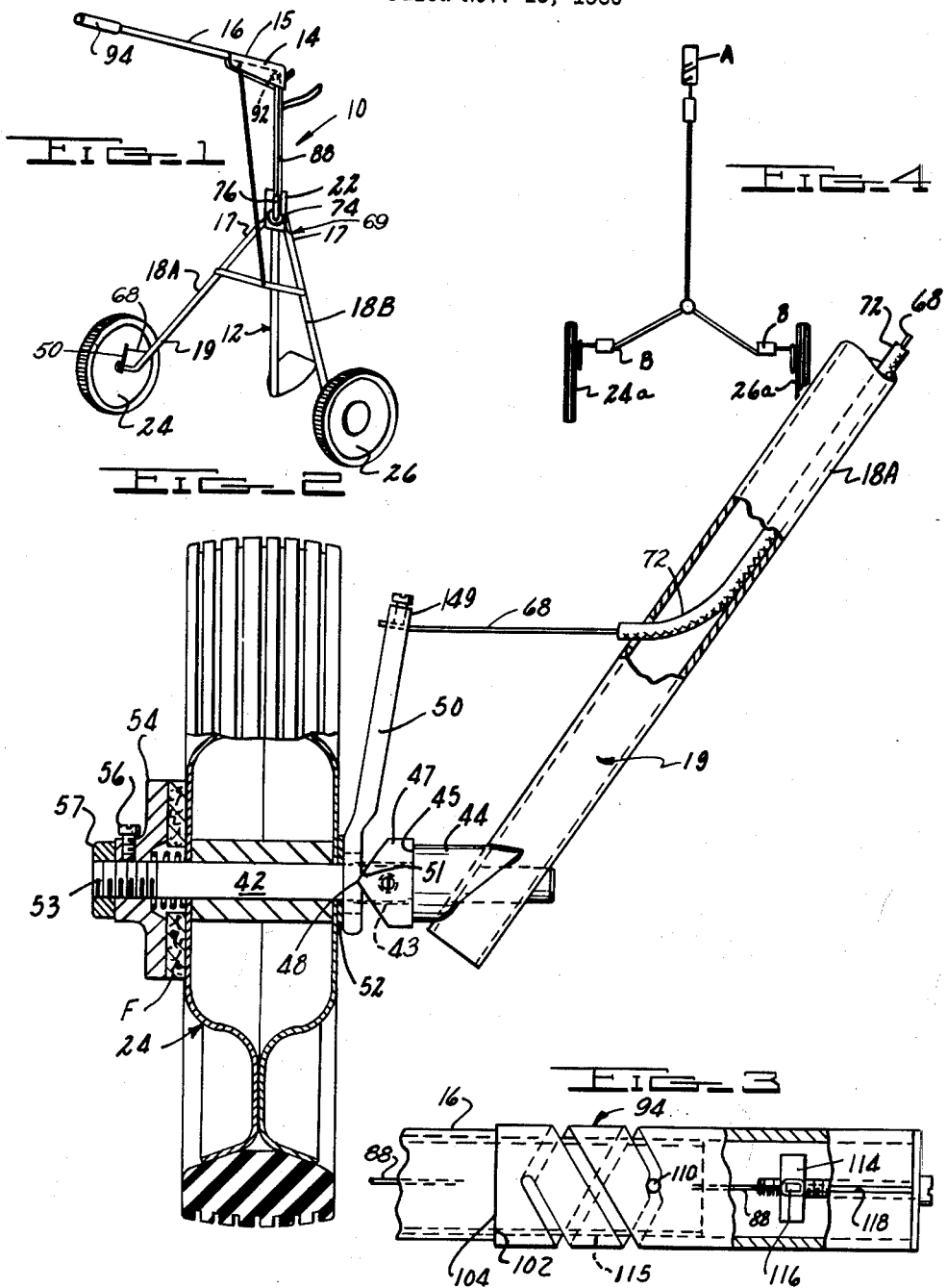
INVENTORS
JESSIE TALBERT HASTINGS
BY BASCOMB DONAL BAILEY
WILSON, SETTLE, M<sup>c</sup>RAE & CRAIG
ATTORNEYS United States Patent Office 3,120,964
Patented Feb. 11, 1964

3,120,964
GOLF CART BRAKE
Jessie Talbert Hastings, 27674 Andover, Dearborn 9, Mich., and Bascomb Donal Bailey, Dearborn, Mich.; said Bailey assignor to said Hastings
Filed Nov. 15, 1960, Ser. No. 69,483
5 Claims. (Cl. 280—41)

The present invention relates to new and useful improvements in golf carts and more particularly to a foldable golf cart with disc brakes.

While a folding golf cart in and of itself is not new, the application of disc brakes thereto, does provide the golfer a useful device not heretofore obtainable. Although the presently manufactured golf carts are a wonderful convenience on the golf course, the addition of a manually operated brake mechanism thereto, adds immeasurably to utility, convenience and pleasure derived from the game.

It is therefore a primary object of the invention to provide a manually operated brake mechanism, for application to a foldable golf cart, which is simple, durable and inexpensive.

Another object of the present invention is the provision of a simple brake mechanism which can be incorporated into golf carts currently in manufacture.

A further object of the invention is the provision of a brake mechanism with a flexible cable wherein the cable is disposed substantially within the folding tubular frame of the golf cart.

Another object of the present invention is the provision of a durable brake mechanism that will last the life of the cart and is adjustable to compensate for wear occurring during usage.

These and other objects can be accomplished by the provision of a golf cart which can be readily opened and closed and having two wheels rotatably secured to a frame member which is pivotable, the improvement comprising a cable actuated brake, said brake positioned adjacent each of said rotatable wheels, while said cable is partially housed within said tubular frame; two legs on said tubular frame, said legs pivotally secured to the lower end of a body member; a solid axle shaft secured to each of said leg members for rotatably positioning two wheels thereon; an adjustable pivot member on each of said axle shafts intermediate said tubular leg member and the outer end thereof; a pivotal arm on each of said axle shafts adjacent said wheels and said adjustable pivot member; one end of said cable secured to each of said pivotal arms, while the other end is secured to a rotatable handle member; a friction disc positioned adjacent each of said rotatable wheels; rotation of said handle operating said cable to actuate said pivotal member in a manner to displace said wheels into engagement with said friction discs so as to limit rotation thereof.

Other objects of this invention will appear in the following description and appended claims, reference being had to the accompanying drawings forming a part of this specification wherein like reference characters designate corresponding parts in the several views.

In the drawings:

FIGURE 1 is a perspective view of an open golf cart which embodies the present invention.

FIGURE 2 is an enlarged cross sectional view taken on the vertical center line of one of the wheels with parts broken away and others being shown in elevation for clarity.

FIGURE 3 is a cross sectional view taken longitudinally through the handle of the golf cart shown in FIGURE 1.

FIGURE 4 is a modified form of the brake applying means of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURE 1 of the drawing illustrates a perspective view of a foldable golf cart assembly 10 that embodies the present invention. The golf cart assembly 10 is made up of three basic parts, namely a straight, cylindrical body member 12, a pivotal handle member 16 and a pair of pivotal legs 18A and 18B.

The handle member 16 is cylindrical in configuration, hollow and pivotally secured to a first bracket member 14, while the leg members 18A and 18B are pivotally affixed to a second bracket member 22. The second bracket member 22 is positioned on the cylindrical body 12, intermediate the ends thereof, while the first bracket member 14 is secured to the upper end of the cylindrical body 12. The first bracket member 14 is of generally U-shaped configuration and is rigidly mounted in an inverted position. The arcuate portion 15 thereof, forms a stop for limiting the upward travel of the pivotal handle member 16 which is mounted thereon. The inner ends 17 of each of the leg members 18A and 18B are pivotally secured to the second bracket member 22, while the outer ends 19 thereof are adapted to have wheels 24 and 26 rotatably journaled thereon.

While the present invention is shown applied to each of the wheel assemblies, it must be understood that this is the preferred form of the present invention. However, for economic reasons, it may be desirable to apply the present invention to a single wheel assembly, which can be readily acomplished without departing from the scope of the present invention.

Since the brake mechanisms used in each of the wheel assemblies 24 and 26 are of the same construction and configuration, only one mechanism will be described. This brake mechanism is illustrated in FIGURE 2 of the drawings, wherein a generally cylindrical axle shaft 42 is mounted on the bottom portion or outer end section 19 of the leg member 18A. Adjacent to the outer end 19 of leg member 18A is a flange 44 which is integral with the axle shaft 42 and forms a perpendicular stop 45 thereon. An adjustable knife-edge member 47 is mounted coaxially on a threaded portion 43 of the axle shaft 42. The apex of the knife-edge portion 48 is directed away from the leg member 18A and is positioned at right angles to the axial center line thereof. A pivotal arm 50 is mounted on the axle shaft 42 and has a corresponding angular knife-edge recess 51 located adjacent to the knife-edge 48 proper and is cooperable therewith. A flat washer 52 is positioned adjacent the generally flat face of the pivotal arm 50 and intermediate the wheel assembly 24.

The outer end 53 of the axle shaft is threaded and has mounted thereon a generally flat and circular breaking flange 54. The breaking flange 54 is adjustably mounted and accurately positioned with a locking screw 56, which extends through the hub of the breaking flange 54 and at right angles to the axle shaft 42. A jam nut 57 is provided on the threaded end portion 53 of the axle shaft 42, to prevent the displacement of the breaking flange should the locking screw 56 accidentally or inadvertently be removed.

The circular breaking flange 54 is generally flat and adapted to engage a frictional breaking material mounted on the side of wheel 24. When the pivotal arm 50 is caused to be displaced or otherwise pivoted about the knife-edge 48, the wheel 24 is caused to be moved into contact with the breaking material. The upper end 149 of the pivotal arm 50 has secured thereto, one end of a flexible cable member 68. The flexible cable member 68 is housed in a sheathing 72, positioned on the inside of the hollow leg member 18A. The sheathing is removed where the cable extends from the leg member 18A and the opposite end of the cable member 68 is secured to the second pivotal arm on the other wheel assembly 26. The central portion 69 of the cable 68 is exposed since the sheathing terminates from the points at which the cable extends through the leg members 18A and 18B. The central portion 69 of cable 68 is positioned or otherwise wrapped over a pulley member 74 mounted on a movable bracket 76. The pulley 74 and bracket 76 are best viewed in FIGURE 1 of the drawings which illustrates the golf cart embodying the present invention.

The bracket member 76 has secured thereto, a second flexible cable 88, which extends upwardly in substantially parallel relationship to the cylindrical body member 12, until reaching the inner end of the handle member 16. A second pulley 92 is positioned in the first bracket member 14 so that the second flexible cable 88 may negotiate the inside of the hollow handle member 16. The cable 88 is secured to a rotatable actuating sleeve section 94 shown in FIGURE 3 of the drawings. It will be noted that the end portion of the hollow handle 16 is of reduced diameter as shown at 115. The inner end portion 102 of the sleeve 94 is adapted to engage the flange 104 formed at the point of reduced diameter. Extending transversely of the reduced diameter handle portion 115 is a pin 110 extending from the handle 16, the ends of which are positioned in opposed double lead spiral slots 112 and 114. Therefore, as the rotatable actuating member 94 is caused to be moved, it will move away from the flange 104.

On the outer end of the actuating member 94, is a threaded nut 114. A pair of opposed ears 116 are formed on said nut 114 and slidably engage a pair of diametrically opposed axial slots 118 in said actuating member 94. The end of cable 88 is secured to the body of the nut 114 and as the actuating member 94 is rotated, the cable 88 is shortened. As this occurs, the bracket member 76 which carries pulley 74 is caused to be moved upwardly. When this occurs, tension is applied to cable 68, the ends of which are secured to the pivotal arms 50 adjacent to the wheels 24 and 26. This movement causes the pivotal arms 50 to move the wheels into contact with the braking flanges 54 and thereby limit rotation of the wheels 24 and 26.

While the above invention has been described as being mechanically actuated with a cable, a totally enclosed liquid system might also be used. Such a modified structure is schematically illustrated in FIGURE 4 of the drawings.

Assuming that a closed hydraulic system were used, compression of cylinder "A" would cause cylinder "B" to extend and thereby actuate the brakes, in the same manner as illustrated in FIGURE 2. Pneumatic means for application of the brakes could also be used successfully.

From the foregoing description, it will be apparent to one skilled in the art that the present invention is simple, durable and inexpensive. Additionally, the invention provides an answer for a problem which has been encountered by golfers for years.

Having thus described our invention, we claim:

1. In a foldable wheeled golf cart, which can be readily opened and closed and having two wheels rotatably secured to a pivotal tubular frame member, the improvement comprising a cable actuated brake, said brake located adjacent each of said rotatable wheels, while said actuating cable is generally housed within said tubular frame; two legs on said tubular frame, said legs pivotally secured to the lower end of a body member; an axle shaft secured to each of said leg members for rotatably positioning two wheels thereon; an adjustable pivot member on each of said axle shafts intermediate said tubular leg member and the end of each of said axle shafts; a pivotal arm adjacent each of said wheels and each of said adjustable pivot members on each of said axle shafts; one end of said actuating cable secured to each of said pivotal arms, while a second cable is secured to the first cable and to a rotatable handle member on the other; a friction disc positioned adjacent each of said rotatable wheels; rotation of said handle operating both of said cables, thereby activating said pivotal members in a manner to displace said wheels into engagement with said friction discs to limit rotation thereof.

2. In a foldable wheeled golf cart which can be readily opened and closed, having a folding tubular body and legs with a pair of wheels rotatably secured to each of the respective legs thereof, the improvement of a cable actuated disc brake, said disc brake positioned adjacent each of said rotatable wheels, while a pair of sheathed cables are housed within said folding tubular frame, said sheathed cables extend from and cooperate with the brake actuating mechanism; an axle shaft of cylindrical configuration secured to each of the legs thereof; said legs pivotally secured to the lower end of a tubular body member; an adjustable wedge shaped pivot member intermediate each of said tubular leg members and the end of each of said axle shafts; a pivotal arm cooperable with said adjustable pivot member; one end of a sheathed cable is secured to each of said pivotal arms, while the second sheathed cable is secured to the first cable, while the other end is secured to a rotatable handle member; rotation of said handle actuating said cables to displace said pivotal arms, thereby displacing said wheels into engagement with said disc brakes so as to limit rotation of said wheels.

3. In a foldable two wheeled golf cart which can be readily opened and closed, the combination of a cable actuated two wheel brake, said brake adjacent each of two rotatable wheels, while the actuating cable is housed within the tubular frame; two legs on said tubular frame, said legs pivotally secured to the lower end of a tubular body member; an axle shaft secured to the base of each of said leg members for rotatably positioning the wheels thereon; an adjustable wedge shaped pivot member intermediate said tubular leg members and the end of said axle shafts; a pivotal arm adjacent each of said adjustable wedge shaped pivot members; one end of a first cable is secured to each of said pivotal arms, while a second cable is secured to said first cable intermediate the ends, while the remainder of said second cable extends through said tubular members so as to be secured to a rotatable handle member; rotation of said handle operable to displace said wheels into engagement with said brake.

4. In a foldable golf cart which can be readily opened and closed, having rotatably secured to a foldable frame, a pair of wheels with manually operated brakes, the improvement of an actuating cable which is housed substantially within said foldable frame; an axle shaft of cylindrical configuration secured to the legs of said foldable frame; an adjustable pivot member positioned intermediate said foldable frame and the end of said axle shaft; a pivotal arm adjacent said adjustable pivot member and positioned on said axle shaft; one end of said cable operably connected to said pivotal arm, while the other end is secured to a rotatable handle member; a friction disc positioned adjacent the outer flange of each of said rotatable wheels; rotation of said handle actuating said pivotal member to tension said cable and displace said wheels into engagement with said friction discs so as to limit the rotation of said wheels.

5. In a foldable golf cart which can be readily opened and closed, the combination of, a cable actuated disc brake mechanism, said disc brake mechanism located adjacent each of two rotatable wheels, while said cable is sheathed and housed within a tubular frame which forms the cart; the central portion of the sheath is cut away intermediate the ends thereof to expose the cable proper; a pair of tubular leg members pivotally secured to said tubular frame; an axle shaft secured to the ends of the tubular legs in substantially parallel relationship to the ground; a wheel on each of said axle shafts; an adjustable wedge shaped pivot member intermediate said tubular leg members and the ends of the axle shafts; a pivotal arm adjacent said adjustable wedge shaped pivot member on each of said axle shafts; a rotatable handle; a spiral slot in said rotatable handle; a movable member in said handle; one end of said cable secured to said pivotal arms and the other to said movable member in said handle, said cable disposed between said pivotal arm and said movable member so as to be cooperable with said spiral slot and thereby axially displace said movable member in a direction to place the cable in tension and apply a braking action to said wheels by displacement of said wheels into engagement with said brake surface.

References Cited in the file of this patent

UNITED STATES PATENTS

| | | |
|---|---|---|
| 2,435,465 | Brown | Feb. 3, 1948 |
| 2,785,906 | Matter | Mar. 19, 1957 |
| 2,855,208 | Abgarian | Oct. 7, 1958 |
| 2,938,303 | Bailey | May 31, 1960 |